Figure 1:
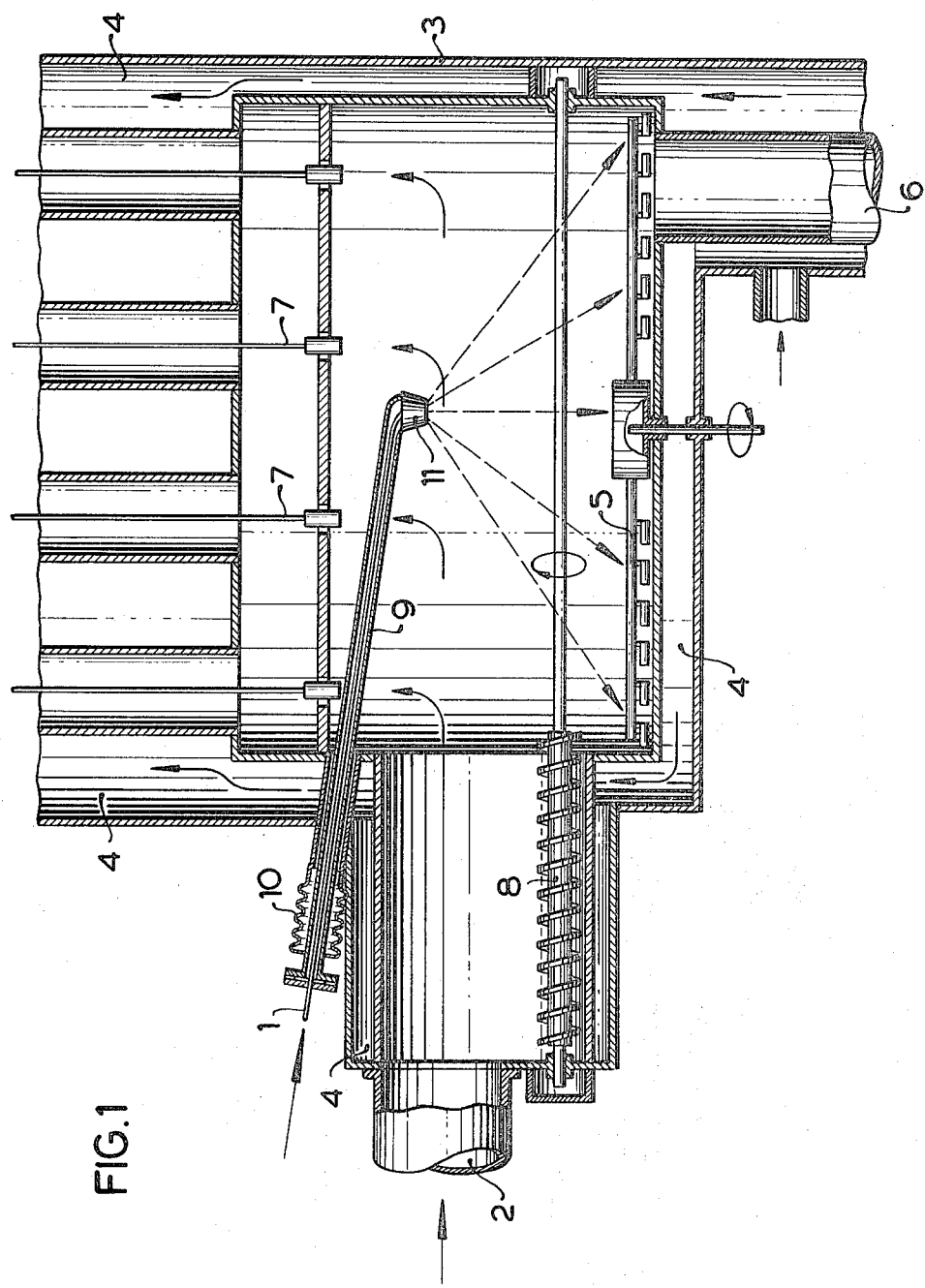

United States Patent [19]
Ebert et al.

[11] 3,830,039
[45] Aug. 20, 1974

[54] PROCESS AND APPARATUS FOR CONTINUOUS WORK-UP OF PHOSPHORUS-CONTAINING RESIDUES

[75] Inventors: Hans Ebert, Hurth-Efferen; Ursus Thummler, Erftstadt Liblar; Hugo Werner, Hurth-Hermulheim, all of Germany

[73] Assignee: Knapsack Aktiengesellschaft, Knapsack bei Koln, Germany

[22] Filed: June 8, 1973

[21] Appl. No.: 368,055

[30] Foreign Application Priority Data
June 13, 1972 Germany.......................... 2228636

[52] U.S. Cl................. 55/5, 34/73, 34/82, 55/9, 55/73, 55/122, 55/124, 55/134, 55/430, 55/466
[51] Int. Cl.................................. B03c 3/01
[58] Field of Search............ 423/322; 423/322, 323, 423/321, 319, 299, 202, 168, 167; 55/4, 5, 6, 7, 8, 9, 10, 11, 12, 22, 73, 106, 108, 122, 124, 134, 135, 466, 428, 430, 432; 34/12, 72, 73, 74, 79, 82

[56] References Cited
UNITED STATES PATENTS

| | | | |
|---|---|---|---|
| 1,291,745 | 1/1919 | Bradley............................ | 55/134 X |
| 1,586,115 | 5/1926 | Pistor et al......................... | 55/73 X |
| 1,692,787 | 11/1928 | Pistor et al......................... | 55/6 |
| 2,682,314 | 6/1954 | Davis, Jr............................ | 55/120 |
| 2,689,019 | 9/1954 | Roberts et al. .................... | 55/120 X |
| 3,444,668 | 5/1969 | Masuda............................. | 55/118 |
| 3,477,203 | 11/1969 | Luge et al.......................... | 55/9 |
| 3,673,768 | 7/1972 | Leonard............................ | 55/135 |
| 3,684,461 | 8/1972 | Muller et al. ..................... | 423/322 X |
| 3,743,700 | 7/1973 | Orr.................................... | 75/10 X |

FOREIGN PATENTS OR APPLICATIONS

| | | | |
|---|---|---|---|
| 1,091,816 | 11/1967 | Great Britain..................... | 423/323 |
| 45-21876 | 7/1970 | Japan................................. | 55/112 |

*Primary Examiner*—Dennis E. Talbert, Jr.
*Attorney, Agent, or Firm*—Connolly and Hutz

[57] ABSTRACT

Continuous work-up of moist, phosphorus-containing residues, particularly of residues which originate from the filtration of yellow phosphorus or phosphorus-containing effluent water. To this end, intimate contact is produced, in an electrical precipitation zone adapted to free phosphorus furnace gas from dust, between the moist phosphorus-containing residue and hot dust originating from phosphorus furnace gas and covering the bottom portion of said electrical precipitation zone. Residue and dust are contacted in a quantitative ratio between 1 and 2. Resulting, substantially phosphorus-free residue is mechanically removed from the electrical precipitation zone together with dust precipitated from the phosphorus furnace gas, in the electrical precipitation zone. A phosphorus/water-mixture produced by vaporization of the moist residue is passed through the electrical precipitation zone and the mixture is introduced jointly with dust-free phosphorus furnace gas coming from the precipitation zone into a condensation zone placed downstream of the precipitation zone, wherein the mixture and dust-free phosphorus furnace gas are precipitated.

15 Claims, 3 Drawing Figures

PROCESS AND APPARATUS FOR CONTINUOUS WORK-UP OF PHOSPHORUS-CONTAINING RESIDUES

The present invention relates to a process and an apparatus for the continuous work-up of phosphorus-containing residues, particularly of those which originate from the filtration of yellow phosphorus or phosphorus-containing effluent water.

The work-up of phosphorus-containing filter cakes has already been described. To this end, the filter cake is predried in a preliminary drying zone, the resulting predried filter cake is conveyed through at least two further drying zones which are maintained at temperatures between 100° and 380°C, gaseous constituents, which escape from the said drying zones, are delivered to a condensation zone and freed therein from phosphorus, and solid matter substantially free from phosphorus is taken from the last drying zone. This process is carried out with the use of an apparatus comprising a centrifugal filter means, which also enables the filter cake to be predried, at least two paddle screw driers and an injection condenser.

This process is not fully satisfactory, however, as it is carried out in several steps which call for the use of expensive machinery. In addition to this, it is necessary for the drying zones to be heated with foreign energy, and for an inert gas atmosphere to be maintained therein, for example by the introduction of nitrogen.

It is accordingly an object of the present invention to provide a fully satisfactory process for the continuous work-up of phosphorus-containing residues, in a one-step operation without the need to supply foreign energy.

The present invention provides more particularly a process comprising producing intimate contact, in an electrical precipitation zone adapted to free phosphorus furnace gas from dust, between a moist phosphorus-containing residue and hot dust originating from phosphorus furnace gas and covering the bottom portion of said electrical precipitation zone, the said residue and dust being contacted in a quantitative ratio between 1 and 2, preferably 1.5; mechanically removing from the said electrical precipitation zone resulting, substantially phosphorus-free residue together with dust precipitated from the phosphorus furnace gas, in said electrical precipitation zone; flowing a phosphorus/water-mixture produced by vaporization of the moist residue through the said electrical precipitation zone and introducing the said mixture jointly with dust-free phosphorus furnace gas coming from the precipitation zone into a condensation zone placed downstream of the said electrical precipitation zone, and effecting precipitation therein of the said mixture and dust-free phosphorus furnace gas.

Further embodiments of the present invention which can be used singly or in combination provide:

a. for the dust covering the bottom portion of the electrical precipitation zone to have a temperature between 300° and 400°C, preferably 350°C;

b. for the phosphorus furnace gas to be passed through the electrical precipitation zone at temperatures between 400° and 640°C, preferably between 460° and 570°C.

A further object of the present invention is to provide an apparatus for the continuous work-up of moist, phosphorus-containing residues, particularly of those which originate from the filtration of yellow phosphorus or phosphorus-containing effluent water, the said apparatus, wherein a double-walled electrical precipitation means is fitted with a conduit adapted to introduce phosphorus furnace gas thereinto, with a raking mechanism and, in its bottom portion, with a discharge outlet, and wherein a screw conveyor, of which the individual threads open into the region above the raking mechanism, is housed in the said conduit, comprising a further conduit, which opens into the electrical precipitation means and is adapted to feed phosphorus-containing residue thereinto; and a dosing feeder, which is housed in said further conduit and positioned at a place outside and remote from the point where said further conduits opens through the double wall into the electrical precipitation means.

Further embodiments of the apparatus of the present invention, which can be used singly or in combination, provide:

a. for said further conduit to be housed in a shield tube extending from outside the double wall to the interior of the electrical precipitation means;

b. for the said shield tube projecting outwardly from the electrical precipitation means to be surrounded by a bellows;

c. for the bellows to be a metal bellows;

d. for the said further conduit opening into the interior of the electrical precipitation means to terminate in a nozzle;

e. for the said further conduit to terminate in a multi-opening nozzle;

f. for the said multi-opening nozzle to be fed with nitrogen or steam under pressures between 1 and 3 atmospheres (gauge);

g. for the said further conduit to terminate above, near the center of rotation of, the raking mechanism;

h. for the said further conduit to terminate above the screw conveyor, near the screw conveyor side facing the said further conduit.

One of the beneficial effects of the process of the present invention resides in the fact that waste heat is used for evaporating phosphorus and water from phosphorus-containing residues. The waste heat originates from the phorphorus furnace and is contained in dust, which is precipitated from gaseous phosphorus in the electrical precipitation apparatus, placed downstream of the phosphorus furnace. The evaporated water and phosphorus originating from phosphorus-containing residue are conveyed jointly with gaseous phosphorus coming from the phosphorus furnace through a spray zone within the electrical precipitation apparatus and the whole is liquefied jointly in the condensation zone placed downstream of the electrical precipitation apparatus.

This has been found favorably to influence the efficiency of the electrical precipitation apparatus. More particularly, steam has been found to obviously improve the precipitation of dust in the electrical precipitation apparatus.

By the use of residue and furnace dust in the quantitative ratio identified hereinabove, it is possible practically completely to distil off phosphorus from the residue, which is to be worked up, and to remove dust containing less than 1 percent of phosphorus, i.e., dust which is not self-ignitable in contact with air, through the bottom of the electrical precipitation apparatus.

The dust obtained in the process of the present invention could not be found to differ chemically or physically from the dust, which is commonly obtained in the production of phosphorus. It is therefore possible for the dust precipitated in the electrical precipitation apparatus of the present invention to be used as an addend to suspensions for making sintered phosphate pellets.

Figure 2:
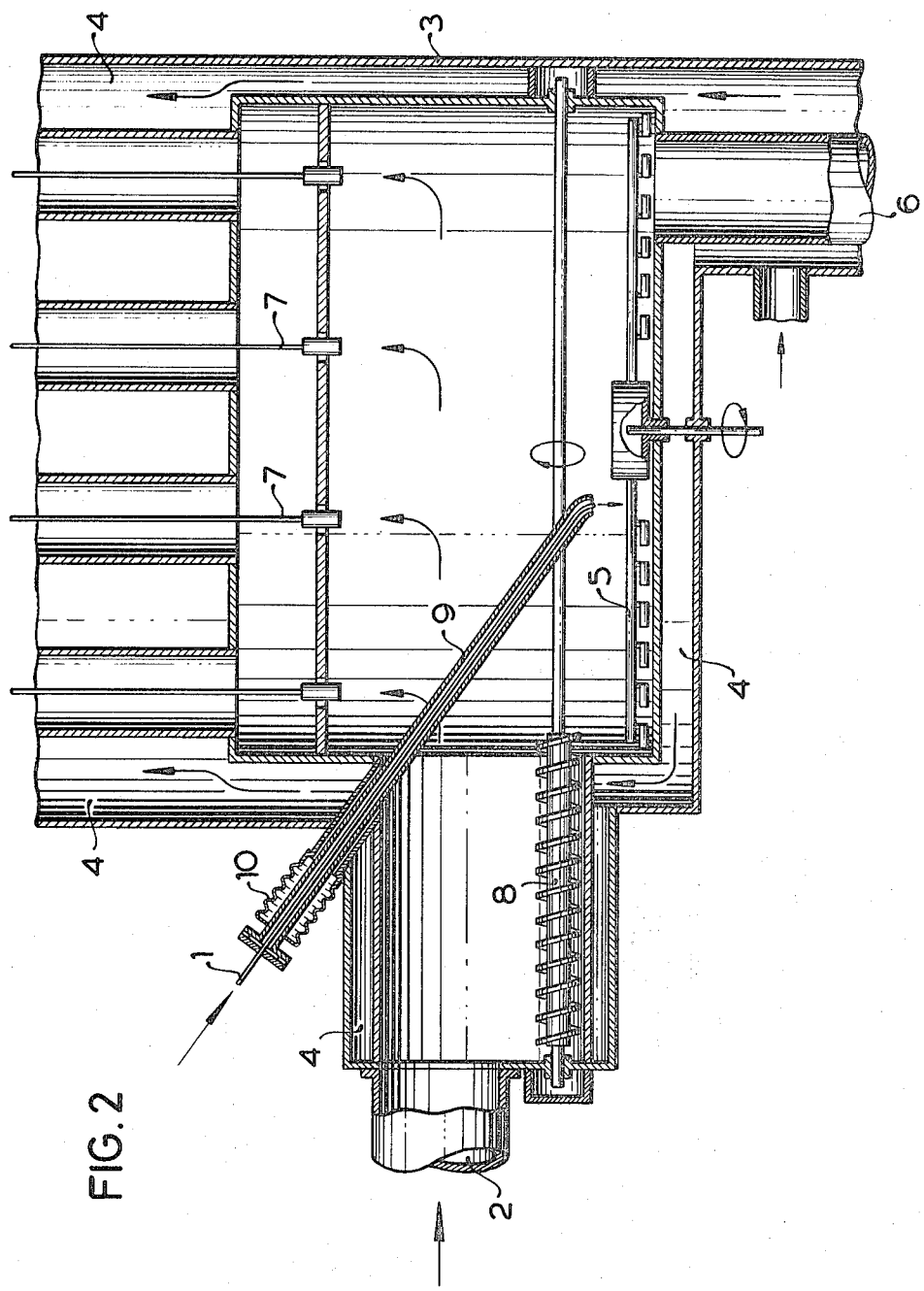
Figure 3:
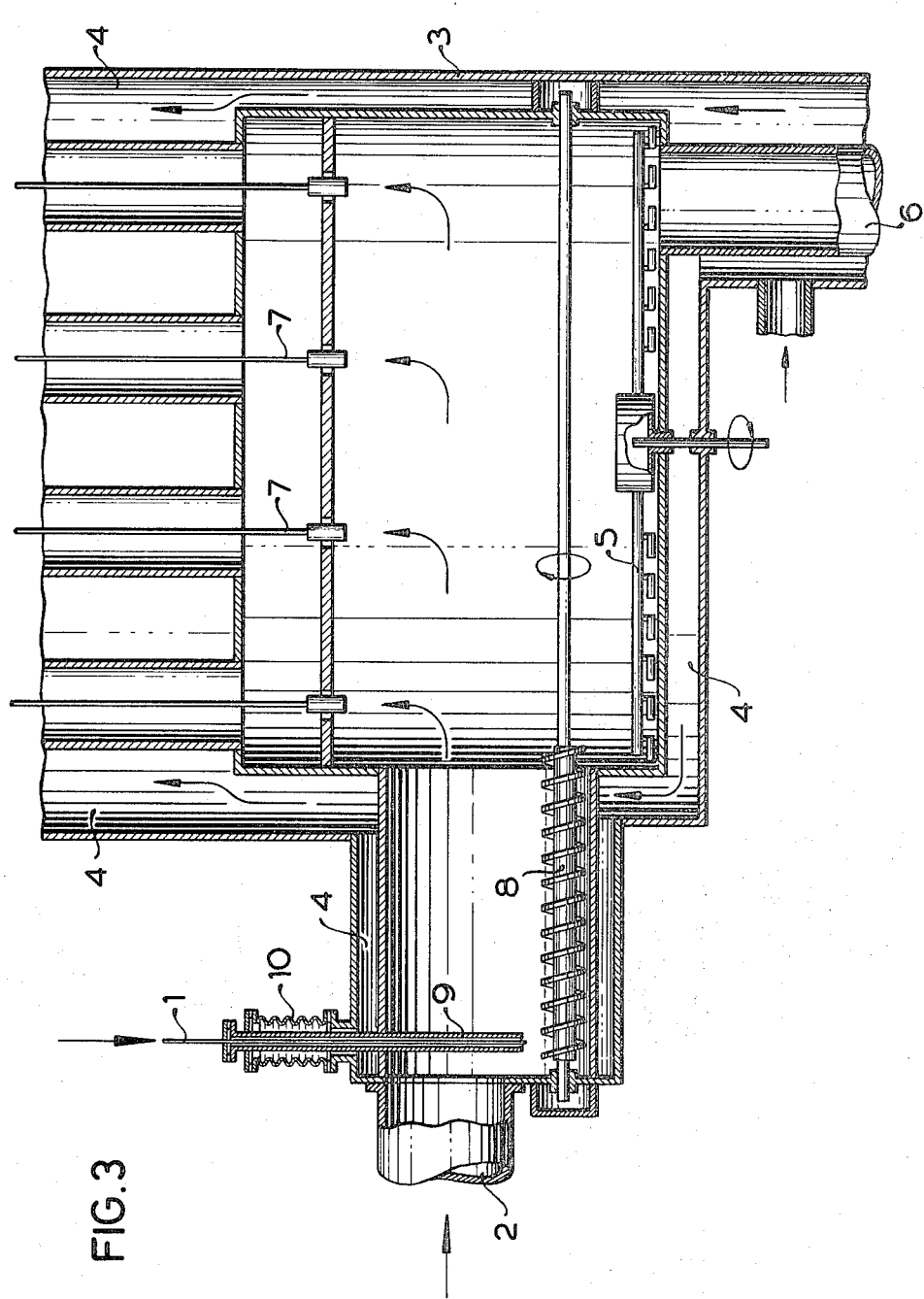

Various exemplary embodiments of the present invention are shown diagrammatically in the accompanying drawings, wherein FIG. 1 is a representation of the electrical precipitation apparatus, phosphorus-containing residue being introduced thereinto by means of a nozzle terminating above the raking mechanism;

FIG. 2 is a representation of the electrical precipitation apparatus, phosphorus-containing residue being introduced thereinto by means of a conduit terminating near the center of rotation of the raking mechanism; and FIG. 3 is a representation of the electrical precipitation apparatus, phosphorus-containing residue being introduced thereinto by means of a conduit terminating above a screw conveyor.

With reference to the drawings:

A gas mixture consisting substantially of phosphorus and carbon monoxide originating from a phorphorus furnace is introduced into an electrical precipitation apparatus 3, which has a double wall jacket, through a conduit 2. Hot combustion gas is introduced through the space 4 left between the two walls of the jacket. Positioned above the bottom of electrical precipitation apparatus 3 is a raking mechanism 5 transporting dust towards outlet 6. Mounted above the bottom, near the entrance side of electrical precipitation apparatus 3 is a screw conveyor 8 conveying solid matter towards raking mechanism 5. Hooked inside the electrical precipitation apparatus 3 is a plurality of spray wires which are connected to the positive terminate of a DC-high tension source. A conduit 1 adapted to introduce phosphorus-containing residue into electrical precipitation apparatus 3, via a feeder, is housed over a part of its length in a shield tube 9 which in turn is housed, outside the electrical precipitation apparatus, in a bellows 10 and is connected to the outer wall of apparatus 3.

In the exemplary embodiment shown in FIG. 1, the feed conduit 1 opening into the interior of electrical precipitation apparatus 3 terminates in a nozzle 11, which enables phosphorous-containing residue to be distributed regularly across the overall bottom region of the electrical precipitation apparatus 3.

In the exemplary embodiment shown in FIG. 2, feed conduit 1 terminates near the center of rotation of raking mechanism 5. The scrapers forming part of raking mechanism 5 are positioned so as to ensure that phosphorus-containing residue and hot dust, which is distributed over the bottom portion of electrical precipitation apparatus 3, are conveyed along a helical path towards outlet 6, through which the material is removed from electrical precipitation apparatus 3. In addition to this, rotary motion is continually imparted to the material which is thereby forced into continual contact with the hot phosphorus furnace gas.

In the exemplary embodiment shown in FIG. 3, feed conduit 1 terminates above screw conveyor 8, wherein hot dust originating from phosphorus furnace gas is intimately mixed with phosphorus-containing residue.

The following Examples further illustrate the process of the present invention, Examples 1 and 2 being given for the purpose of comparison.

EXAMPLE 1

5,000 normal cubic meters (S.T.P.) of hot, dust-containing phosphorus furnace gas, which had a temperature between 460° and 550°C and contained 35 grams of dust per normal cubic meter, were introduced into an electrical precipitation apparatus. Hot combustion gas was caused to travel through the jacket surrounding the electrical precipitation apparatus so as to maintain the inside wall at a temperature of substantially 350°C and avoid condensation of phosphorus. Dust removed from the electrical precipitation apparatus contained 0.5 percent of elementary phosphorus; it could not be found to be self-ignitable in contact with air.

EXAMPLE 2

480 kg/h of phosphorus-containing residue, which contained 59 percent of phosphorus, 33 percent of water and 8 percent of water-insoluble solids, were introduced through a feed conduit into an electrical precipitation apparatus, which was operated under the conditions reported in Example 1. (Weight of residue: weight of furnace gas = 2.74). Dust removed from the electrical precipiation apparatus was found to contain 3.6 percent of elementary phosphorus and to glow up in contact with air.

EXAMPLE 3

230 kg/h of phosphorus-containing residue, which contained 62 percent of phosphorus, 30 percent of water and 8 percent of water-insoluble solids, were introduced through a feed conduit into an electrical precipitation apparatus, which was operated under the conditions reported in Example 1. (Weight of residue: weight of furnace gas = 1.31). Dust removed from the electrical precipitation apparatus contained 0.8 percent of elementary phosphorus; it could not be found to be self-ignitable in contact with air.

EXAMPLE 4

260 kg/h of phosphorus-containing residue, which contained 56 percent of phosphorus, 30 percent of water and 14 percent of water-insoluble solids, were introduced through a feed conduit into an electrical precipitation apparatus, which was operated under the conditions reported in Example 1. (Weight of residue: weight of furnace gas = 1.49). Dust removed from the electrical recipitation apparatus contained 0.9 percent of elementary phosphorus; it could not be found to be self-ignitable in contact with air.

EXAMPLE 5

180 kg/h of phosphorus-containing residue, which contained 56 percent of phosphorus, 30 percent of water and 14 percent of water-insoluble solids, were introduced through a feed conduit into an electrical precipitation apparatus, which was operated under the conditions reported in Example 1. (Weight of residue: weight of furnace gas = 1.03). Dust removed from the electrical precipitation apparatus contained 0.6 percent of elementary phosphorus; it could not be found to be self-ignitable in contact with air.

We claim:

1. Process for the continuous work-up of moist, phosphorus-containing residues, which process comprises producing intimate contact, in an electrical precipitation zone adapted to free hot phosphorus furnace gas from dust, between the moist phosphorus-containing residue and hot dust originating from the phosphorus furnace gas and covering the bottom portion of said electrical precipitation zone, the said residue and dust being contacted in a quantitative ratio between 1 and 2; mechanically removing from the said electrical precipitation zone resulting, substantially phosphorus-free residue together with the dust precipitated from the phosphorus furnace gas, in said electrical precipitation zone; flowing a phosphorus/water-mixture produced by vaporization of the moist residue through the said electrical precipitation zone and introducing the said mixture jointly with dust-free phosphorus furnace gas coming from the electrical precipitation zone into a condensation zone placed downstream of the said electrical precipitation zone, and effecting precipitation therein of the said mixture and dust-free phosphorus furnace gas.

2. The process as claimed in claim 1, wherein the dust covering the bottom portion of the electrical precipitation zone has a temperature between 300° and 400°C.

3. The process as claimed in claim 2, wherein the dust covering the bottom portion of the electrical precipitation zone has a temperature of 350°29 C.

4. The process as claimed in claim 1, wherein the phosphorus furnace gas flowing through the electrical precipitation zone has temperatures between 400° and 640°C.

5. The process as claimed in claim 4, wherein the phosphorus furnace gas flowing through the electrical precipitation zone has a temperature between 460° and 570°C.

6. The process as claimed in claim 1, wherein phosphorus-containing residue and hot dust are used in a quantitative ratio of 1.5:1.

7. Apparatus for the continuous work-up of moist, phosphorus-containing residues, wherein a double-walled electrical precipitation means is fitted with a conduit adapted to introduce phosphorus furnace gas thereinto, with a raking mechanism and, in its bottom portion, with a discharge outlet, and wherein a screw conveyor, of which the individual threads open into the region above the raking mechanism, is housed in the said conduit; comprising a further conduit, which opens into the electrical precipitation means and is adapted to feed phosphorus-containing residue thereinto; and a dosing feeder, which is housed in said further conduit and positioned at a place outside and remote from the point where said further conduits opens through the double wall into the electrical precipitation means.

8. The apparatus as claimed in claim 7, wherein the said further conduit terminates above, near the center of rotation of, the raking mechanism.

9. The apparatus as claimed in claim 7, wherein the said further conduit terminates above the screw conveyor, near the screw conveyor side facing the said further conduit.

10. The apparatus as claimed in claim 7, wherein said further conduit is housed in a shield tube extending from outside the double wall to the interior of the electrical precipitation means.

11. The apparatus as claimed in claim 10, wherein the said shield tube projecting outwardly from the electrical precipitation means is surrounded by a bellows.

12. The apparatus as claimed in claim 11, wherein the bellows is a metal bellows.

13. The apparatus as claimed in claim 7, wherein the said further conduit opening into the interior of the electrical precipitation means terminates in a nozzle.

14. The apparatus as claimed in claim 13, wherein the said nozzle is a multi-opening nozzle.

15. The apparatus as claimed in claim 14, wherein the said multi-opening nozzle is fed with nitrogen or steam under pressures between 1 and 3 atmospheres (gauge).

* * * * *

UNITED STATES PATENT AND TRADEMARK OFFICE
CERTIFICATE OF CORRECTION

PATENT NO. : 3,830,039
DATED : August 20, 1974
INVENTOR(S) : Hans, Ebert, Ursus, Thummler et al It is certified that error appears in the above-identified patent and that said Letters Patent are hereby corrected as shown below:

Claim 3, line 3, change "350°29C." to -- 350°C. --

Signed and Sealed this twenty-seventh Day of April 1976

[SEAL]

Attest:

RUTH C. MASON
Attesting Officer

C. MARSHALL DANN
Commissioner of Patents and Trademarks